No. 717,447. Patented Dec. 30, 1902.
J. A. OSWALD.
CASH REGISTER.
(Application filed Nov. 7, 1900.)
(No Model.)
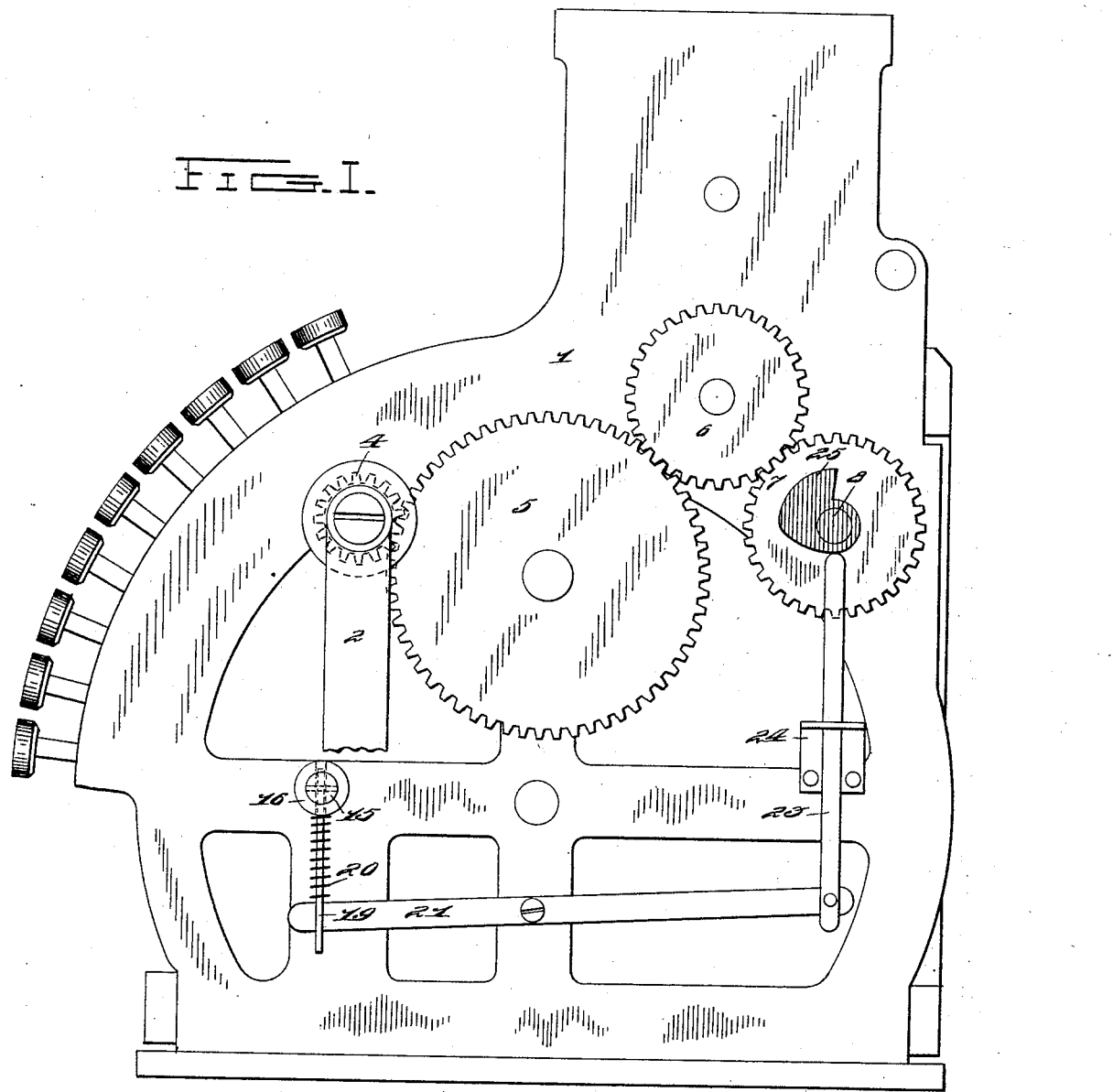

UNITED STATES PATENT OFFICE.

JACOB A. OSWALD, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 717,447, dated December 30, 1902.

Application filed November 7, 1900. Serial No. 35,783. (No model.)

*To all whom it may concern:*

Be it known that I, JACOB A. OSWALD, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in registers of the type patented to Cleal and Reinhard, No. 580,378, and each of which includes as one of its component parts an operating crank handle or lever.

The object of the invention is to provide mechanism whereby the operating-handle of a cash-register may make a certain predetermined number of movements and then be arrested.

In the accompanying drawings, forming part of this specification, Figure 1 represents a side elevation of a machine of the class mentioned with my invention applied thereto, the cabinet and cash-drawer being omitted. Fig. 2 represents a detail front elevation, partly in section, of the lower end of the crank-handle and its arresting-latch; and Fig. 3 represents a detail horizontal section through the handle portion of the crank-handle.

In the aforesaid drawings, 1 represents the frame of the machine, and 2 the operating crank-handle. This crank-handle 2 is suitably journaled on the main frame and carries a pinion 4, which meshes with a large gear-wheel 5, journaled on the frame. The gear 5 meshes with a smaller gear-wheel 6, also journaled on the main frame and meshing with a similar-sized gear-wheel 7, fast to the main rotation-shaft 8. The relative sizes of the gears 4, 5, 6, and 7 are such that two revolutions of the gear 4 will cause only one revolution of the gear 7, and thus the crank-handle must be rotated twice to give the rotation-shaft 8 of the machine one revolution.

The handle portion of the crank-handle is hollow and is provided with a slotted spring-pressed stop-plunger 9, as better shown in Fig. 3. This plunger is provided with a pin 10, extending through its slotted portion and cooperating with the beveled wall of a notch 11, formed in a headed thumb-pin 12, which latter is mounted in a lateral passage 13, formed in said handle. This construction of the handle with its plunger and thumb-pin is old and well known in the art and its action will be readily understood without further explanation. The plunger 9 when projecting from the handle, as shown in Fig. 3, will contact with a stop-plunger 15, and thus arrest the handle in its normal position. The said plunger 15 is similar to the plunger 9 and is mounted in a hollow lug or projection 16 of the main frame, which projects out through an aperture 17, formed in the cabinet 18 of the machine, as shown in Fig. 2. A notched bar 19 passes through the plunger 15 and coacts therewith to withdraw it out of the path of the plunger 9 and against the tension of its spring in the same manner that the pin 12 coacts with its respective plunger.

The bar 19 is normally held in the position shown in Figs. 1 and 2 by a coil-spring 20, which surrounds said bar and bears with its opposite ends against the projection 16, and a lever 21, which is pivoted upon the main frame and projects at its forward end through an elongated slot 22, formed in the said bar. The rear end of the lever 21 is pivotally connected to a vertical plunger-bar 23, which is guided by an apertured bracket 24, mounted on the main frame. The upper end of the bar 23 contacts with the periphery of a cam 25, fast on the rotation-shaft 8. The operation of the device is as follows:

The devices normally stand in the position shown in Fig. 2, with the end of the plunger 15 projecting into the path of the plunger 9 to lock the operating-handle. To operate the handle, the plunger 9 is withdrawn into the handle by pressure upon the thumb-pin 12. The handle is then rotated, the cam 25 meanwhile operating the plunger 15 through the parts above described. When the handle has made one complete revolution, it will not be arrested by the plunger 15, as the latter is at this period within the projection 16 and out of the path of the plunger 9. Before the handle again reaches its normal position, however, the cam 25 and intermediate parts release the plunger 15 and allow it to move into the path of the plunger 9 to arrest the handle at its normal position.

It will be seen from the above description that while the main rotation-shaft 8 of the machine is making one complete revolution the crank-handle is making two complete revolutions, thus reducing the necessary operating power to a minimum.

Having thus described my invention, what I claim as new, and desire to secure by Letters Patent, is—

1. In a cash-register, the combination with an operating mechanism, of an operating-handle, a movable stop for said handle and means connecting the operating mechanism and stop to move the latter out of the path of the handle at every other revolution of said handle.

2. In a cash-register, the combination with an operating mechanism, of an operating-handle, a movable stop for said handle mounted independently of the same and connected to the operating mechanism, and a movable stop mounted on said operating-handle and coacting with the first-mentioned stop.

3. In a cash-register, the combination with an operating mechanism, of an operating-handle, a movable stop for said handle so connected to the operating mechanism, as to be withdrawn and projected upon alternate operations of the handle to arrest or allow free operation of said handle.

4. In a cash-register, the combination with an operating mechanism, of an operating-handle, a movable stop for said handle connected to the operating mechanism, a movable stop mounted on the handle and arranged to coact with the first-mentioned stop, and means also mounted on the handle for moving the stop which is mounted on said handle.

5. In a cash-register, the combination with an operating mechanism, of a rotatable operating crank-handle for the same, and a movable stop so connected to the operating mechanism as to be moved out of and into the path of the rotatable crank-handle during two operations of said handle to arrest the latter at the end of the second revolution.

6. In a cash-register, the combination with an operating mechanism of a rotatable operating crank-handle, a movable stop mounted independently of the handle and so connected to the operating mechanism as to normally stand projected but arranged to be withdrawn during the operation of the machine, and a stop on the handle adapted to engage the first-mentioned stop when the latter is in normal position and arranged to be moved out of such engagement before the regular operation of the machine.

7. In a cash-register, the combination with an operating mechanism, of an operating-handle for the same, a stop-plunger mounted independently of the handle and normally spring-pressed into the path of the latter, and means connected to the operating mechanism for withdrawing the stop-plunger out of the path of the operating-handle when the latter is actuated to impart movement to the operating mechanism.

8. In a cash-register, the combination with an operating mechanism, of an operating-handle for the same, a spring-pressed plunger forming a stop for said handle and means connected to the operating mechanism for first withdrawing said plunger out of the path of the handle when the latter is actuated and then subsequently during the same operation of the handle releasing it to allow it to again lock the handle.

9. In a cash-register, the combination with an operating mechanism including a rotary shaft, and a crank-handle, of gearing connecting the shaft and handle whereby two revolutions of the latter cause one revolution of the former, a movable stop for the handle and means connecting the rotary shaft and stop.

10. In a cash-register, the combination with an operating mechanism including a rotary shaft and a crank-handle, a movable stop-plunger arranged to be projected into the path of said handle, a slide for retracting said plunger, a cam on the rotary shaft and means connecting the slide and cam.

In testimony whereof I affix my signature in the presence of two witnesses.

JACOB A. OSWALD.

Witnesses:
 F. JOS. DODDS,
 IRA BERKSTRESSER.